UNITED STATES PATENT OFFICE.

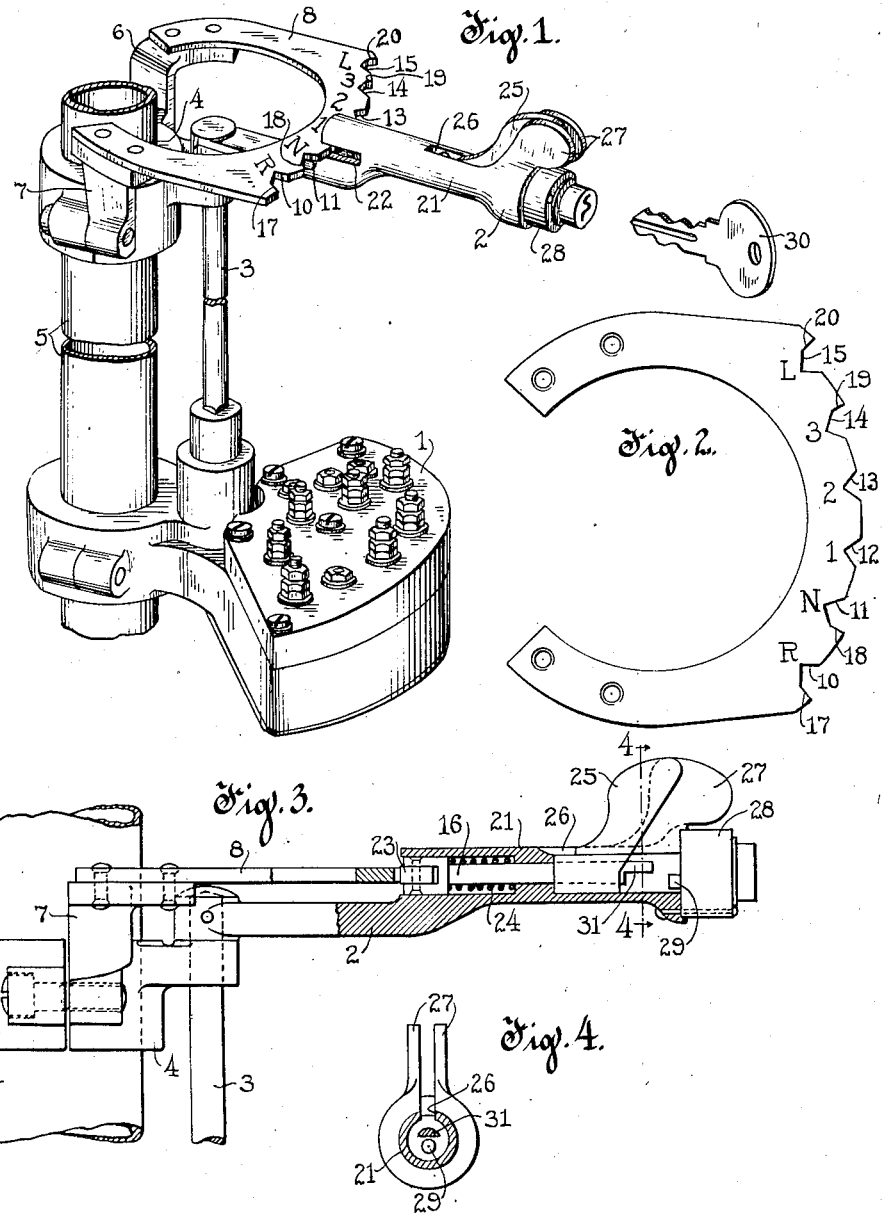

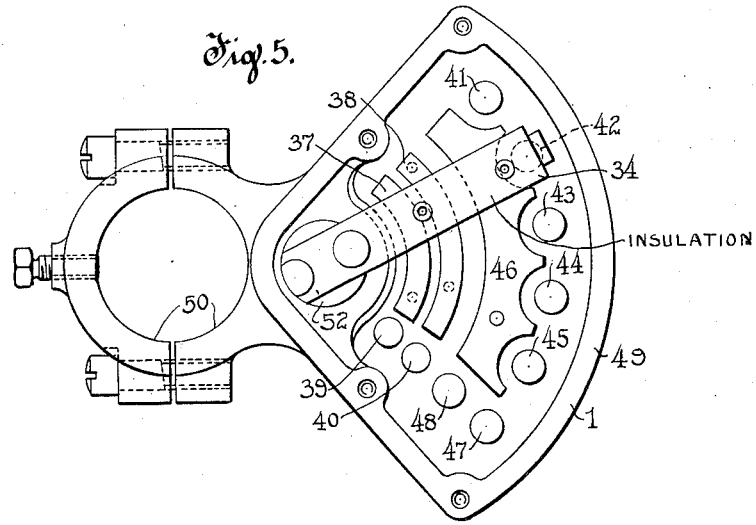
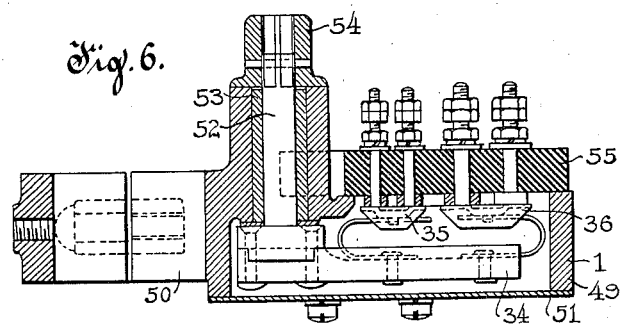
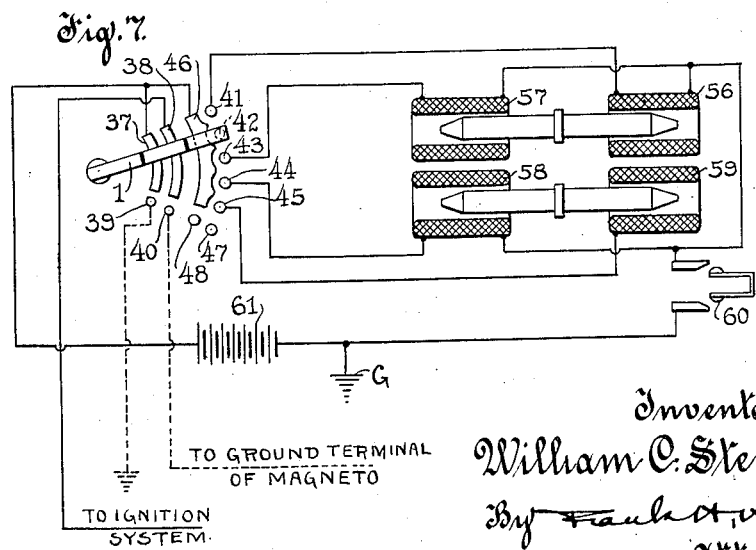

WILLIAM C. STEVENS, OF MILWAUKEE, WISCONSIN, ASSIGNOR TO THE CUTLER-HAMMER MFG. CO., OF MILWAUKEE, WISCONSIN, A CORPORATION OF WISCONSIN.

GEAR-SHIFT CONTROLLER.

1,299,257.   Specification of Letters Patent.   Patented Apr. 1, 1919.

Application filed July 25, 1918. Serial No. 246,629.

*To all whom it may concern:*

Be it known that I, WILLIAM C. STEVENS, a citizen of the United States, residing at Milwaukee, in the county of Milwaukee and State of Wisconsin, have invented new and useful Improvements in Gear-Shift Controllers, of which the following is a full, clear, concise, and exact description, reference being had to the accompanying drawing, forming a part of this specification.

This invention relates to gear shift controllers for automobiles and the like and is particularly applicable to controllers for electromagnetic gear shifting mechanisms.

Such gear shifting mechanisms are designed for preselection of speeds and the present invention has among its objects to provide a more convenient and more readily installable speed preselecting controller therefor.

A further object is to provide a controller of the character stated which may be utilized for both gear shift and ignition control.

A further object is to provide a controller of the aforesaid character which may be readily locked in a position for neutralizing the gears and for rendering the ignition circuit inoperative.

Various other objects and advantages of the invention will hereinafter appear.

The accompanying drawings illustrate a controller embodying the invention, the same being particularly designed for an electromagnetic gear shifting mechanism and said controller will now be described, it being understood that the same is susceptible of modifications falling within the scope of the appended claims and that certain features thereof might be advantageously embodied in controllers for other forms of gear shifting mechanisms.

In the drawing,

Figure 1 is a perspective view of the controller;

Fig. 2 is a plan view of a part thereof;

Fig. 3 is a side elevational view of the operating lever, certain parts thereof being shown in section;

Fig. 4 is a sectional view on line 4—4, Fig. 3;

Fig. 5 is a bottom plan view of a switch embodied in the controller;

Fig. 6 is a vertical sectional view of said switch; and

Fig. 7 is a diagrammatic view illustrating certain circuit connections for the controller.

Referring to Fig. 1, the controller includes a switch 1 for installation below the vehicle floor boards, an actuating lever 2 for mounting in a convenient position on the steering column, preferably near the steering wheel, and a shaft 3 operatively connecting said switch and lever.

The lever 2 is fixed to the end of the shaft 3, said shaft having a bearing in a bracket 4 adapted to be clamped to the steering column of which a section 5 is illustrated. The bracket 4 is provided with upstanding lugs 6 and 7 to which is secured an arc-shaped plate 8 having a portion concentric to the axis of shaft 3 and said portion being provided with notches 10 to 15 inclusive to receive a pawl 16 provided on lever 2. As will appear, the switch 1 has different predetermined positions for different circuit connections and the notches of plate 8 are so arranged as to receive the pawl of lever 2 when the switch occupies any one of said positions. The notches 12 and 13 are of simple V-shape, while the notches 10, 11, 14 and 15 have similar converging walls and also walls forming abrupt shoulders 17, 18, 19 and 20 to act as stops for the pawl, the shoulders 17 and 20 projecting a greater radial distance from the axis of the lever than the shoulders 18 and 19.

Referring to Fig. 3, the lever is provided with an offset hollow cylindrical extension 21 recessed at 22 to receive the edge of plate 8 and the pawl 16 is reciprocably mounted within said extension. The pawl comprises a pin provided at its extremity with a roller 23 and provided with a spring 24 biasing it within the lever to maintain said roller in engagement with the periphery of plate 8. On the other hand, the pawl is provided with a lug 25 projecting through a slot 26 in the lever to provide a finger piece whereby it may be manually retracted against the action of spring 24, said lever having a bifurcated finger piece 27 into which the lug 25 projects. Thus the pawl 16 will coöperate with the notched plate 8 for restraint of lever 2 in the different operative positions of switch 1, the arrangement being such that the pawl will yield to pressure on the lever to permit the latter to be moved from notch 10 to notch 14 or from notch 15 to notch 11, or back and forth between notches 14 and 11. On the other hand, the arrangement is such that said pawl must be manually retracted for clearing the shoulder 18 to permit movement of the lever from notch 11 to notch 10 and for clearing shoulder 19 to permit movement of said lever from notch 14 to notch 15. As will hereinafter appear, notches 11, 12, 13 and 14 respectively correspond to the positions of switch 1 for neutralization of the gear shift and for first, second and third forward speed settings thereof, while notch 10 corresponds to the position of the switch for reverse setting of the gear shift and notch 15 corresponds to the position of the switch for neutralizing the gear shift and for rendering the ignition circuit inoperative. Accordingly the stop shoulder 18 functions to prevent accidental reverse setting of the gear shift while the stop shoulder 19 functions to prevent the ignition circuit from being accidentally rendered inoperative.

The lever 2 is further provided at its outer end with a barrel-type lock 28 having an eccentric pin 29 rotatable by a key 30 into and out of the path of a lug 31 on the pawl 16. The arrangement is such that when the pin 29 is rotated into the path of the lug on the pawl it limits the retraction of the pawl to such a degree that when the same is projected in the notch 15 it is prevented from withdrawal therefrom, thus providing for positively locking the switch in position to both neutralize the gears and interrupt the ignition circuit.

Referring to Figs. 5 and 6, the switch comprises a pivoted insulating arm 34 carrying two spring contacts 35 and 36, the former to alternately bridge segments 37 and 38 or contact buttons 39 and 40 and the latter to selectively bridge contacts 41 to 45 with a segment 46 or to engage contact buttons 47 and 48. The contact arm and its coöperating contacts are all supported by a casting 49 having a steering column clamp 50, said casting being hollow to receive the contact arm and having a detachable bottom plate 51. The contact arm is fixed to a short spindle 52 having a bushed bearing 53 in the casting and said spindle has fixed to its upper end a socket member 54 to receive the shaft 3 which connects said arm to lever 2. The contact segments and buttons are all fixed to an insulating base 55 which is secured to the top of the casting to form therewith a closed casing for all of the switch parts.

Referring to Fig. 7, the same shows schematically the switch 1 and a conventional form of gear shift having operating solenoids 56, 57, 58 and 59 and a master switch 60 to be operated by the clutch pedal. The solenoids are supplied with current from a battery 61 through switch 1 which has its segment 46 connected to one terminal of the battery and its contact buttons 41, 43, 44 and 45 connected to solenoids 56, 57, 58 and 59 respectively, all of said solenoids having a common return through master switch 60 to the battery 61. Thus assuming the solenoid 56 to provide for reverse setting of the gear shift and solenoids 57, 58, and 59 to respectively provide for settings of the gear shift for first, second and third forward speeds, it will be observed that operation of the lever 2 will effect energization of said solenoids in the order above described, it being borne in mind that the switch is shown in an inverted position. Also, it will be observed that when the switch engages contact 42 or contact 47, both of which are dead, all of the solenoids will be deënergized for neutralization of the gear shift.

Further, Fig. 7 exemplifies the use of switch 1 to control either a battery ignition system or a magneto ignition system. The switch is shown as provided with a lead from segment 37 to the battery and with a lead from segment 38 for a battery ignition system, it being assumed that said system has a ground return and the battery being shown with a ground connection G. Thus with the segments proportioned as illustrated, the switch will complete such ignition circuit throughout its movement from contact button 41 to contact button 45 but when moved to its extreme position will render said ignition circuit inoperative. Also the switch has a lead from contact button 40 for the ground terminal of a magneto and a lead from contact button 39 to ground whereby the switch when in an extreme position will ground the magneto and in all other positions interrupt the grounding connection. It is to be understood that any other preferred connections might be made for control of the ignition circuit.

What I claim as new and desire to secure by Letters Patent is:

1. In a controller for gear shifting mechanisms for automobiles and the like, in combination, a gear shift selector device and ignition control means associated therewith.

2. In a controller for gear shifting mechanisms for automobiles and the like, in combination, a gear shift selector device and ignition control means associated therewith and operable thereby to render the controlled ignition system inoperative upon a given setting of said device.

3. In a controller for gear shifting mechanisms for automobiles and the like, in combination, a gear shift selector device, ignition control means associated therewith and operable thereby to render the controlled ignition system inoperative upon setting of said device in a predetermined position and means for locking said device in said predetermined position.

4. In a controller for gear shifting mechanisms for automobiles and the like, in combination, a gear shift selector device having forward and reverse operative positions and a plurality of neutralizing positions and ignition control means associated therewith and operable thereby to render the controlled ignition system inoperative upon setting of said device in one of said neutralizing positions and to render such ignition system operative in all other aforesaid positions of said device.

5. In a controller for gear shifting mechanisms for automobiles and the like, in combination, a gear shift selector device having forward and reverse operative positions and a plurality of neutralizing positions, ignition control means associated therewith and operable thereby to render the controlled ignition system inoperative upon setting of said device in one of said neutralizing positions and operative upon setting of said device in all other aforesaid positions and means for locking said device in said latter neutralizing position.

6. A selector switch for electromagnetic gear shifting mechanisms for automobiles and the like including a movable contact member and stationary contacts to be engaged thereby, said member coöperating with certain of said contacts to selectively control the gear shifting mechanism and coöperating with other of said contacts for ignition control.

7. In a controller for electromagnetic gear shifting mechanisms for automobiles and the like, in combination, a gear shift selector switch, ignition control means associated therewith and operable thereby to render the controlled ignition system inoperative in a predetermined position of said switch, an operating lever for said switch and locking means associated with said lever to provide for locking said switch in said predetermined position.

8. In a controller for electromagnetic gear shifting mechanisms for automobiles and the like, in combination, a gear shift selector switch having forward and reverse operative positions and a plurality of neutralizing positions, ignition control means associated therewith and operable thereby to render the controlled ignition system inoperative upon setting of said switch in one of said neutralizing positions, an operating lever for said switch and locking means associated with said lever to provide for locking said switch in said latter neutralizing position.

9. The combination with a gear shift selector switch having a plurality of forward positions, a reverse position, and a plurality of neutralizing positions, of ignition control means associated therewith, said means being operable to render the ignition system controlled thereby inoperative upon setting of said switch in one of said neutralizing positions, an operating lever for said switch and releasable means associated with said lever to normally prevent movement thereof into positions corresponding to the latter neutralizing position of said switch and the reverse position thereof.

10. The combination with a gear shift selector switch having a plurality of forward positions, a reverse position, and a plurality of neutralizing positions, of ignition control means associated therewith, said means being operable to render the ignition system controlled thereby inoperative upon setting of said switch in one of said neutralizing positions, an operating lever for said switch, releasable means associated with said lever to normally prevent movement thereof into positions corresponding to the latter neutralizing position of said switch and the reverse position thereof and means for locking said lever in a position corresponding to the latter neutralizing position of said switch.

11. The combination with a gear shift selector switch having a plurality of forward positions, a reverse position and a plurality of neutralizing positions, of ignition control means associated therewith, said means being operable to render the ignition system controlled thereby inoperative upon setting of said switch in one of said neutralizing positions, an operating lever for said switch and means for restraining said lever in positions corresponding to the positions of said switch, said restraining means including a pawl element carried by said lever, and a stationary notched plate coöperating therewith.

In witness whereof, I have hereunto subscribed my name.

WILLIAM C. STEVENS.